United States Patent
Grund et al.

(10) Patent No.: US 7,177,720 B2
(45) Date of Patent: Feb. 13, 2007

(54) MACHINE TOOL AND METHOD FOR OPERATING A MACHINE TOOL

(75) Inventors: Peter Grund, Trossingen (DE); Rolf Kuppinger, Schlierbach (DE); Karl Frommer, Schlierbach (DE)

(73) Assignee: STAMA Maschinenfabrik GmbH, Schlierbach (DE)

( * ) Notice: Subject to any disclaimer, the term of this patent is extended or adjusted under 35 U.S.C. 154(b) by 0 days.

(21) Appl. No.: 11/134,570

(22) Filed: May 19, 2005

(65) Prior Publication Data

US 2005/0209730 A1    Sep. 22, 2005

Related U.S. Application Data

(63) Continuation of application No. PCT/EP2003/01232, filed on Nov. 5, 2003.

(30) Foreign Application Priority Data

Nov. 19, 2002 (DE) .................. 102 55 033

(51) Int. Cl.
*G06F 19/00* (2006.01)
(52) U.S. Cl. .................. 700/186; 702/162; 82/137; 219/121
(58) Field of Classification Search ........ 700/180, 700/192, 190, 188, 160, 186; 82/1–11, 137, 82/118; 702/162
See application file for complete search history.

(56) References Cited

U.S. PATENT DOCUMENTS

| | | | |
|---|---|---|---|
| 3,496,805 A | 2/1970 | Ulrichsen et al. | |
| 4,442,493 A | 4/1984 | Wakai et al. | |
| 4,597,040 A | 6/1986 | Buizer | |
| 4,714,999 A * | 12/1987 | Kiya et al. | 700/180 |
| 5,060,544 A | 10/1991 | Hanaki et al. | |
| 5,414,633 A | 5/1995 | Chang | |
| 5,777,450 A * | 7/1998 | Kono et al. | 318/568.11 |
| 5,793,635 A * | 8/1998 | Niwa | 700/192 |
| 5,825,655 A * | 10/1998 | Nakagawa et al. | 700/175 |

FOREIGN PATENT DOCUMENTS

| | | |
|---|---|---|
| DE | 1 602 867 | 11/1967 |
| DE | 31 26 276 | 7/1981 |

(Continued)

OTHER PUBLICATIONS

"Aufgabenteilung—Kommunications- und Steuerungsmöglichkeiten einer SPS and CNS" (with English language abstract), *Indusrie-Anzeiger* ,pp. 86-88 (1991).

(Continued)

*Primary Examiner*—Kidest Bahta
(74) *Attorney, Agent, or Firm*—Klarquist Sparkman, LLP (57) ABSTRACT

A machine tool comprises a tool carrier moveable relative to a workpiece to be machined. A controller controls the relative movement of the tool carrier and the workpiece by means of a control program. If an unplanned event occurs during the operational movement of the machine, the relative movement of the tool and the workpiece is stopped, and a restart from a starting position is carried out later. The starting position is in this case approached along a trajectory, and the trajectory is determined automatically as a function of the machining operation in which the unplanned event occurred.

28 Claims, 6 Drawing Sheets

FOREIGN PATENT DOCUMENTS

| | | |
|---|---|---|
| DE | 33 29 658 | 8/1983 |
| EP | 0 137 046 | 4/1985 |
| EP | 0 373 222 | 6/1990 |
| EP | 1 058 171 | 12/2000 |
| WO | 00/66320 | 11/2000 |

OTHER PUBLICATIONS

Moreaux, M. et al., "CNC and PLC: are they one and the same for Machine-Tools," *IEEE*, pp. 924-927 (1991).

International Search Report (WO 2004/046836).

* cited by examiner

MACHINE TOOL AND METHOD FOR OPERATING A MACHINE TOOL

CROSS-REFERENCES TO RELATED APPLICATIONS

This application is a continuation of copending international patent application PCT/EP2003/012321, filed on Nov. 5, 2003 designating the U.S. and published on Jun. 3, 2004 in German language, which international patent application claims priority under the Paris Convention from German patent application 102 55 033.6 filed on Nov. 19, 2002. These prior applications are incorporated by reference herein.

BACKGROUND OF THE INVENTION

The present invention relates to a method for operating a machine tool and to a machine tool operated in accordance with this method. More particularly, the invention relates to a method of controlling relative movements of a tool held in the machine and a workpiece after an unexpected or otherwise unplanned interruption of the machining operation occurred.

Modern machine tools for metal cutting machining of workpieces are capable of carrying out a large number of complex machining operations in an automated manner. These machining operations can include, for example, milling, turning, boring, grinding and others. A plurality of machining tools and types of machining tools can be clamped into a tool carrier. The tool carrier typically comprises an operating spindle, which brings the clamped tool into a rotating movement (inter alia during boring and milling). In many cases, the operating spindle can additionally be moved in a number of spatial directions, so that it is able to act at various spatial points on the workpiece to be machined. However, the tool carrier can also be rigid and interact with an appropriately moved workpiece holder, which is in particular the case in turning. Furthermore, the workpiece can also be moveably held. All that matters in the cotext of the present invention is the relative movement between the tool and the workpiece. These relative movements take place along what are known as NC axes.

Generally, the machining of a workpiece is controlled by what is known as a NC control (numerical control). A (first) control program, which is known as the NC program, is loaded into the NC controller by the operator of the machine tool. The NC program contains a large number of control sets to be carried out successively, wherein the relative movements between tool and workpiece are controlled by the control sets for each machine step.

Responsibility of the NC controller in its original sense is restricted to the movements of the NC axes. Accordingly, various auxiliary units belonging to the machine tool are controlled by a second controller, which is typically known as a PLC (programmable logic controller). The auxiliary units include, in particular, a tool magazine, in which the necessary tools (mills, drills, turning tools etc.) are stored, a tool changer for inserting and removing tools from the magazine and the tool carrier, a pivotable working table, on which the workpieces can be clamped, or units for the supply of coolant, compressed air and others. It goes without saying that the control processes of the NC controller and of the PLC have to be coordinated well, and this is generally done by means of data interchange via suitable interfaces. The NC controller and the PLC are sometimes combined in one structural unit in today's machines, so that there is physically only one control unit but which combines both functionalities in itself.

Modern machine tools of the type described before are capable of producing workpieces at high machine speeds and with constant quality. The faster the machine tool operates, the more items can be produced. However, the production sequence, which is already very efficiently configured nowadays, is severely disrupted if, during the operation of the machine tool, unexpected/unplanned interruptions occur, such as a power failure, an emergency stop triggered automatically or by hand, erroneous operation in the form of an unintended manual intervention or an overload situation which, for example, is caused by a tool breakage. In such events, the programmed movement sequence is interrupted more or less abruptly. In order to resume the production sequence, the machine tool must first of all be brought by hand into a starting state again, from which a restart and, in particular, re-entry into the NC program can be carried out. Depending on the cause of the unplanned stop and depending on the current operating situation in which the interruption occurred, however, it is currently difficult to place a machine tool in the suitable starting state. The stoppage times associated with this are detrimental to the production sequence. In addition, there is the risk of a "crash" because of an erroneous operation in this situation.

WO 00/66320 suggest to monitor the power supply of a machine tool in order, in the event of a power failure being detected, to activate a mechanical energy store, which maintains the power supply for a certain time interval. Using the mechanically produced "residual energy", the operating spindle is moved into a park position. In this way, restarting the machine tool after a power failure is already made substantially easier.

However, this approach is restricted to situations in which the electric power supply fails unexpectedly. Furthermore, there are other approaches according to which a controlled stop is carried out within the first seconds or fractions of a second after an emergency stop command has been triggered. However, in spite of such individual measures, there remains a whole series of scenarios in which a restart of the machine tool is complicated and lengthy, which can lead to long down times of the machine.

SUMMARY OF THE INVENTION

It is an object of the present invention to provide a method and a machine tool of the kind mentioned at the beginning which allow down times resulting from unplanned interruptions in the production sequence to be reduced.

It is another object of the invention to provide a method and a machine tool which allow higher production yields by minimizing down times of the machine caused by unexpected interruptions during the machining cycle.

According to one aspect, this object is achieved by a method for operating a machine tool, wherein, at the time of a restart, the tool carrier is first moved along defined second relative trajectories into a starting position, and wherein the second relative trajectories are determined automatically as a function of the machining operation in which the unplanned event occurred.

According to another aspect, a machine tool of the kind mentioned at the beginning comprises a starting logic which is configured such that, after an unplanned interruption of the machining operations, the tool carrier is firstly moved along defined second relative trajectories into a starting position, wherein the second relative trajectories are determined automatically as a function of the machining operation in which the interruption occurred.

In the novel method and the novel machine tool, the tool carrier is firstly moved (at the beginning of the restart) from its current position following the stoppage into a defined starting position, irrespective of the type and cause of the unplanned interruption. Second relative trajectories for approaching the staring point are determined automatically by using data which represent at least the interrupted machining operation (in particular process data and machine parameters, inter alia). The machine operator does not require specific knowledge or skills in order to move the machine into the starting position.

The machine tool is preferably brought into a uniform starting position, from which the resumption of the production process is generally possible, irrespective of the type and cause of the respective interruption. In a particularly preferred case, the starting position includes that the operating spindle deposits the tool last held in the tool magazine and moves into its rest position.

The new method differs from the approach followed in WO 00/66320 inter alia in that moving to the starting position represents the first automated step during the restarting of the machine tool. As a result, the starting position is independent of the operating position of the tool carrier at the time of the interruption and during the stoppage. No part is played by how far the current axial position at the time of the interruption is away from the starting position preferred for the restart, since the starting position is not yet moved to in the last seconds or fractions of a second after the interruption but only at the beginning of the restart, for example only after the power supply has been re-established. The relative position in which the tool carrier is located immediately after the stoppage is of importance only inasmuch as this position forms the starting point for the second trajectory determined automatically.

The new method therefore does not necessarily replace the approaches of the type described in WO 00/66320 but, on the contrary, can even complement them. At the time of the interruption or in the immediate time around this, attempts are primarily made to bring the tool and/or the workpiece as quickly as possible into a secured position in the manner of "emergency braking". Since time and possibly power for the "emergency braking" are available only to a restricted extent, however, the stoppage positions which can be achieved therewith depend on the specific case and are subject to restrictions. In addition, the machine units involved are generally not coordinated but in any case brought "hastily" into safety. At this point, the novel method then begins and, according to the invention, leads to the machine being brought simply and quickly into a defined starting state.

Accordingly, the starting position moved to can in principle be chosen freely, and it can therefore be optimized simply such that a particularly simple and fast restart is possible under all conceivable combinations of cases. The time for the restart can already be shortened by means of this optimization.

In addition, the novel method and the corresponding machine tool have the advantage that the starting position for the restart is moved to along automatically determined second trajectories. A possibly lengthy analysis of the situation following a stoppage, and the selection of a suitable "return strategy" by an operator can therefore be dispensed with. This contributes to a substantial shortening of the down times. A particularly important reduction of down times additionally results in all those cases in which, otherwise, a knowledgeable operator has to be called to a stopped machine in order to perform the analysis of the situation in a skilled manner.

Surprisingly, it has turned out that the automatic determination of the second relative trajectories is possible in a large number of practical cases merely by using data which are already available in the machine tool due to the programmed machining operations and the machine parameters. Only for a relative small number of special cases is it advantageous if additional data are stored in the machine tool before the production process is started. This primarily applies to the machining of very complex and/or very large workpieces, since in these cases the path of the tool carrier along the second relative trajectories can be impeded by workpiece geometries.

If the entry of additional data is dispensed with, it might be that not all possible situations in which an unplanned interruption occurs can be coped with simply and quickly, but at least a significant number of situations can be coped with simply and quickly. Coping virtually completely with the realistically possible scenarios is possible with relative little additional effort, as will be explained in more detail in the following with respect to some exemplary embodiments. Overall, however, irrespective of the "extension level" of the invention, a significant reduction in down times and therefore higher productivity can be achieved.

In a refinement of the invention, the spindle holds a tool from a set of possible tools during the machining operations, and the second relative trajectories are determined as a function of that tool which is held in the tool carrier when the unplanned event occurs. The corresponding machine tool accordingly includes a tool magazine, in which a set of various tools can be held ready, with the starting logic being constructed in such a way that the second relative trajectories are determined as a function of that tool which is held in the tool carrier when the unplanned interruption occurs.

It has turned out that the second relative trajectories can be determined very effectively if the properties of the tool held in the tool carrier at the time of the interruption are taken into account as a significant factor. For example, if the relevant tool is a milling head for an internal contour, it is a simple and effective strategy for the second trajectories firstly to withdraw the internal mill in the z direction (relative to the workpiece), in order then to move the spindle into the starting position. In the case of a lathe tool for vertical turning with external machining, a suitable strategy is, by contrast, first of all a relative movement in the y direction. In the case of a thread tap, it is additionally advantageous, possibly even necessary in the individual case, to rotate the spindle at the same time as the withdrawal.

According to this refinement of the invention, different tools and tool types generally result in individual and possibly mutually differing second trajectories. However, in this refinement the number of strategies which have to be kept ready in the control of the machine tool in order to determine the second trajectories may be reduced sharply. Therefore, implementation of the inventive method is possible very efficiently and effectively.

In a further refinement, the second relative trajectories are selected from a set of prepared second relative trajectories. This set is preferably stored in the starting logic of the novel machine tool.

This measure constitutes a simple practical implementation in which, for a large number of conceivable scenarios, the suitable strategy is prepared and stored in the machine tool. Accordingly, the second trajectories can be determined relative quickly. In addition, the measure has the advantage that the analytical capabilities of an experienced machine operator/developer can be "imaged" in a quite simple way in the controller of the machine tool. In this way, an implementation is provided which works without fundamental changes or interventions in the operating system of the controllers used. This is of particular advantage since the manufacturers of modern machine tools generally procure the controllers as supply parts and therefore do not have direct access to the internal operating sequences of the controller, i.e. the operating system. The manufacturer of a machine tool can implement the novel method without the corresponding participation of a manufacturer of controllers.

In a further refinement, the second trajectories are determined as a function of first parameters which are stored in the first controller, preferably in the first control program, before a machining operation.

As already mentioned, it has turned out that the second trajectories can in a large number of cases be determined merely by using data which are already available in the operating sequence of a conventional machine tool. Examples of this are the data already mentioned further above, which distinguish various tool types from one another. In some scenarios, however, additional data are helpful in order to be able to determine the second trajectories as efficiently as possible. For example, in the case of a milling tool for machining an external contour, it is helpful to know how much space is available around the external contour in order to lift the mill laterally off the machined external contour. However, this information is closely linked with the workpiece to be machined in each case, i.e. it generally cannot be determined from the start by the developer of the machine tool. However, the aforementioned refinement offers the possibility of taking into account workpiece-dependent information, even though it was not needed hitherto, in a relatively simple way when determining the second trajectories. For instance, this information can be used as a type of reference point for the determination of the second relative trajectory.

The additional information related to the production process is preferably integrated into the creation of the NC program, since here all the workpiece-specific data already required hitherto are also stored. With little additional effort, virtually complete automation for the restarting of a machine tool can be achieved in accordance with this refinement.

In a further refinement, the second trajectories are determined as a function of second parameters, which are stored in a non-volatile memory.

It has turned out that the determination of the second trajectories is made substantially easier if specific items of information, which are no longer needed in a conventional NC controller after the completion of a control set, are saved in a non-volatile manner. One example of this is the pitch angle of a thread tap. By means of non-volatile storage, data of this type are available even after a complete power failure, and the second trajectories can then be determined more easily by taking into account these data. On the other hand, the amount of information to be entered additionally by the operator can be reduced without the number of scenarios to be coped with automatically being impaired. The convenience for the operator is thus improved.

In a further refinement, the second relative trajectories are determined as a function of the first relative trajectories defined in the first control program. Preferably, the starting logic of the machine tool therefore includes a logic part for determining the second relative trajectories as an image of the first relative trajectories run through in the reverse direction ("reverse image").

This measure requires an extension to the operating system of the NC controllers offered hitherto. The practical implementation is therefore initially more complicated than the measures described hitherto (at least in the view of a manufacturer of machine tools who, on his own, generally has no access to the operating system of an NC controller). On the other hand, the measure has the advantage that, by means of complete reconstruction of the first trajectories and corresponding "reverse running", the second trajectories can be determined optimally in virtually all conceivable scenarios. The level of automation and the efficiency can be increased still further.

In a "slimmed down" variant, however, it is also conceivable to determine the second trajectories by using parameters from the first trajectories, without a complete "reverse run" as a basis. The expenditure on the part of the controller manufacturer is lower in this case, while, on the other hand, many conceivable scenarios for the automatic determination of the second trajectories can be managed.

In a further refinement, there is an operating parameter read in at a restart, and, depending on the operating parameter read in, that machining operation in which the unplanned event occurred is started again.

As a result of this measure, the operator of the machine tool is in the position to easily influence the otherwise largely automated restart with respect to whether or not a partly machined workpiece is to be finished or a completely new fabrication cycle is to be started. The latter is desirable in particular when the unexpected event which led to the stoppage of the machine tool resulted in damage or impairment to the workpiece being machined at that time. In particular in the case of workpieces which are subject to very high precision requirements, it is advantageous to start a completely new machining cycle. If, on the other hand, lower fabrication tolerances are acceptable, the entire production process can be configured more efficiently if a partly machined workpiece is finished completely.

In a further refinement, the machine tool further comprises auxiliary units which are driven in coordination with the first relative trajectories of the tool carrier and, at a restart, all the auxiliary units are moved into a starting position which is determined automatically in each case as a function of the machining operation in which the unplanned event occurred. The machine tool in this case preferably has a second controller for controlling auxiliary units, with the starting logic coordinating the first and the second controller, at least during the restart following the unplanned interruption.

In this refinement, the inventive approach is extended to form a comprehensive, integrated overall concept, in which preferably all the main and auxiliary units involved in the machining operations are incorporated in the automatic restart. As a result, a particularly convenient way of quickly and simply restarting a complex machine tool after an interruption is provided. As a result of the incorporation of the movement of the auxiliary units, the number of interventions by an operator otherwise required is reduced still further. Erroneous operations are more reliably prevented. It is particularly advantageous in this case if the movements of the auxiliary units are also determined individually from the "history" of the interrupted machining operation, i.e. as a function of the interrupted machining operation.

In a further refinement, the tool carrier is moved along the second relative trajectories at a lower speed than along the first relative trajectories.

At first glance, this measure may lead to the down times of the machine tool being prolonged unnecessarily, which rather contradicts the object of the present invention. In fact, however, the time delays are small as compared with the time gains which generally are possible with the new approach. On the other hand, the present refinement has the advantage that the operator can better monitor and, if appropriate, intervene in the automated movements to the starting position, should an unforeseen problem occur due to an unfavourable configurations of circumstances. It is particularly advantageous if the speeds used when running through the second trajectories can be varied by the operator since, in this case—even without specific specialist knowledge about the actual machining operation—the operator can monitor the automated sequences well, while the delay times are minimised at the same time. In individual scenarios, for example, down times could be reduced by several hours, whereas the delay caused by using a lower speed would lie in the range of only a few seconds or minutes.

It goes without saying that the features mentioned above and those still to be explained below can be used not only in the respectively specified combination but also in other combinations or on their own without departing from the scope of the present invention.

BRIEF DESCRIPTION OF THE DRAWINGS

Exemplary embodiments of the invention are illustrated in the drawing and will be explained in more detail in the following description. In the drawing.

DESCRIPTION OF PREFERRED EMBODIMENTS

Figure 1:
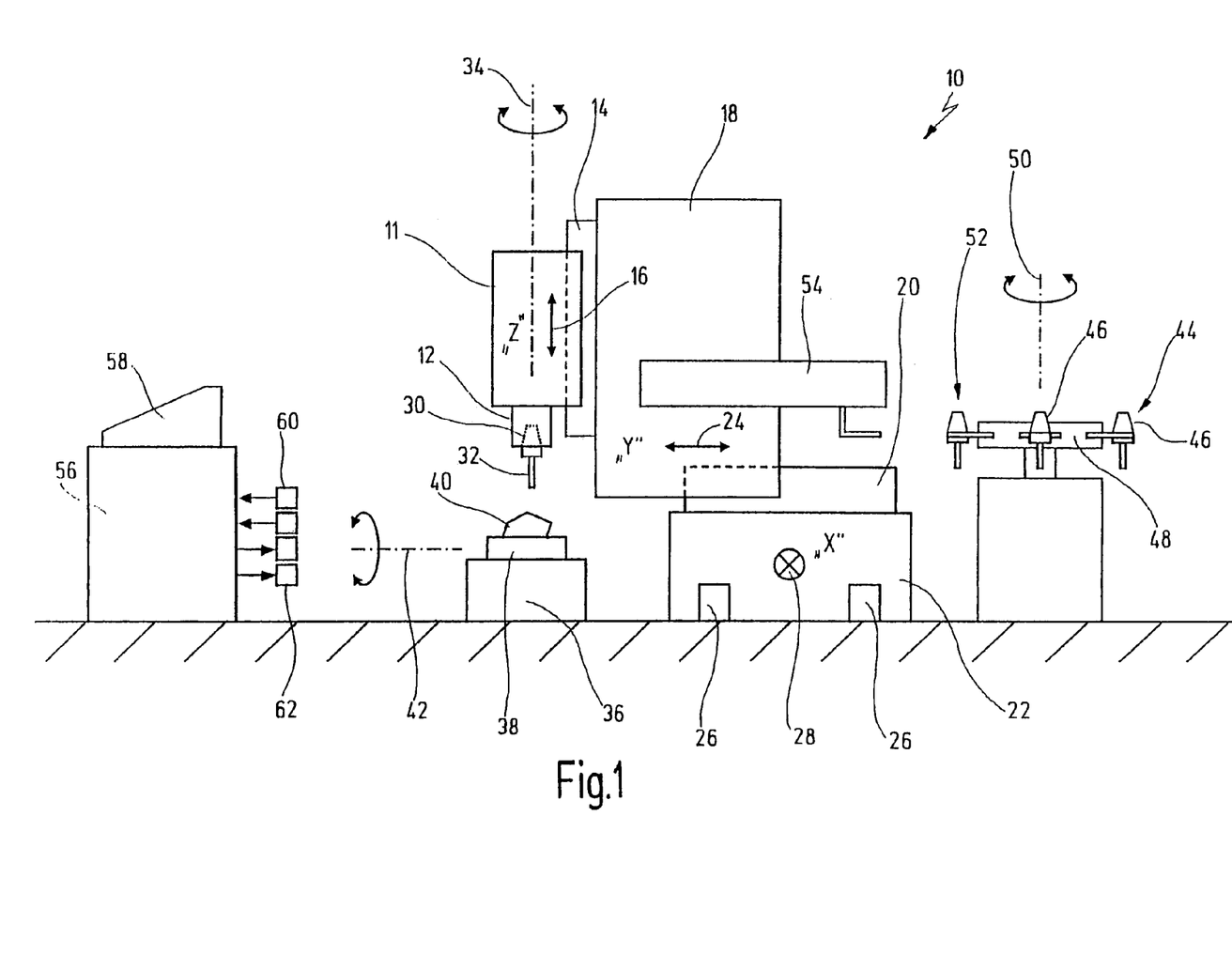
FIG. 1 shows a machine tool according to the invention in a schematic overview.

In FIG. 1, a machine tool in accordance with the invention is designated overall by the reference number 10.

The machine tool 10 has a spindle box 11 comprising an operating spindle 12, which represents a tool carrier in the sense of the present invention. Spindle box 11 is here arranged on a machine part 18 via a first guide carriage 14 such that it can move in the direction of an arrow 16. Movement in the direction of arrow 16 is usually designated a movement in the z direction.

Machine part 18 is mounted on a further machine part 22 via a second guide carriage 20 and can accordingly move in the direction of an arrow 24, i.e. in the y direction. Machine part 22 is in turn seated on guide rails 26, again such that it can move, the movement direction (x direction) perpendicular to the plane of the paper being indicated in the usual way by symbol 28. Overall, spindle box 11 including operating spindle 12 can therefore be moved in all three spatial directions and, given appropriate control, along virtually any desired trajectories.

It should be noted that the mounting of the operating spindle 12 shown here represents a typical (and here simplified) example of current machine tools. However, the invention is not restricted to this type of machine construction and can generally also be used in other movement concepts, for example in the case of what is known as a hexapod arrangement or in machine concepts with a stationary tool carrier.

Arranged at the lower end of operating spindle 12 is a tool reception 30, in which a tool 32 is accommodated. The tool can be rotated about z axis 34 via the operating spindle 12, which permits various machining operations.

Reference number 36 designates a workpiece table, on which a workpiece 40 is clamped in a clamping device 38. Workpiece table 36 in the exemplary embodiment shown here can be pivoted about an axis 42, which represents a further degree of freedom in the relative positioning of tool 32 and workpiece 40. For sake of good order, however, it should be pointed out that the invention is not restricted to machine tools having a pivotable workpiece table 36. Rather, it can also be applied in machine tools with other movable workpiece holders, for example for machining rod-like workpieces, and also in machine tools without movable workpiece holders.

Reference number 44 designates a tool magazine, in which a large number of tool holders 46 are stored. Each tool holder 46 holds a tool provided for a machining operation, which tool can be clamped in the tool reception 30 of spindle 12 by means of the tool holder 46. In the exemplary embodiment shown here, the tool holders 46 are arranged on a chain 48 which can be moved about an axis 50. It is therefore possible for each tool holder 46 to be brought into a transfer position 52 suitable for a tool change. By means of a tool changer 54, merely illustrated schematically here, a tool holder held in the operating spindle 12 can be replaced by another from the magazine 44.

Once more sake of completeness, it should be pointed out that, instead of the tool magazine shown here with a chain conveyor, other magazine concepts can also be used. Furthermore, the pivotable workpiece table 36 and the tool magazine 44 with tool changer 54 are illustrated here as typical examples of auxiliary units which, in the operating sequence of the machine tool 10, have to be coordinated with the movements of the operating spindle 12. Further auxiliary units are, for example, air compressors, coolant pumps and further rotary or pivoting drives.

Reference number 56 designates a control unit, in which the control functionalities of an NC controller and of a PLC are implemented here in the usual way. Reference number 58 designates an operating desk belonging to the control unit 56.

The control unit 56 picks up status signals 60 from diverse sensors on the machine tool 10 and, on the basis of these, generates control signals 62 which control the machining operations.

Figure 2:
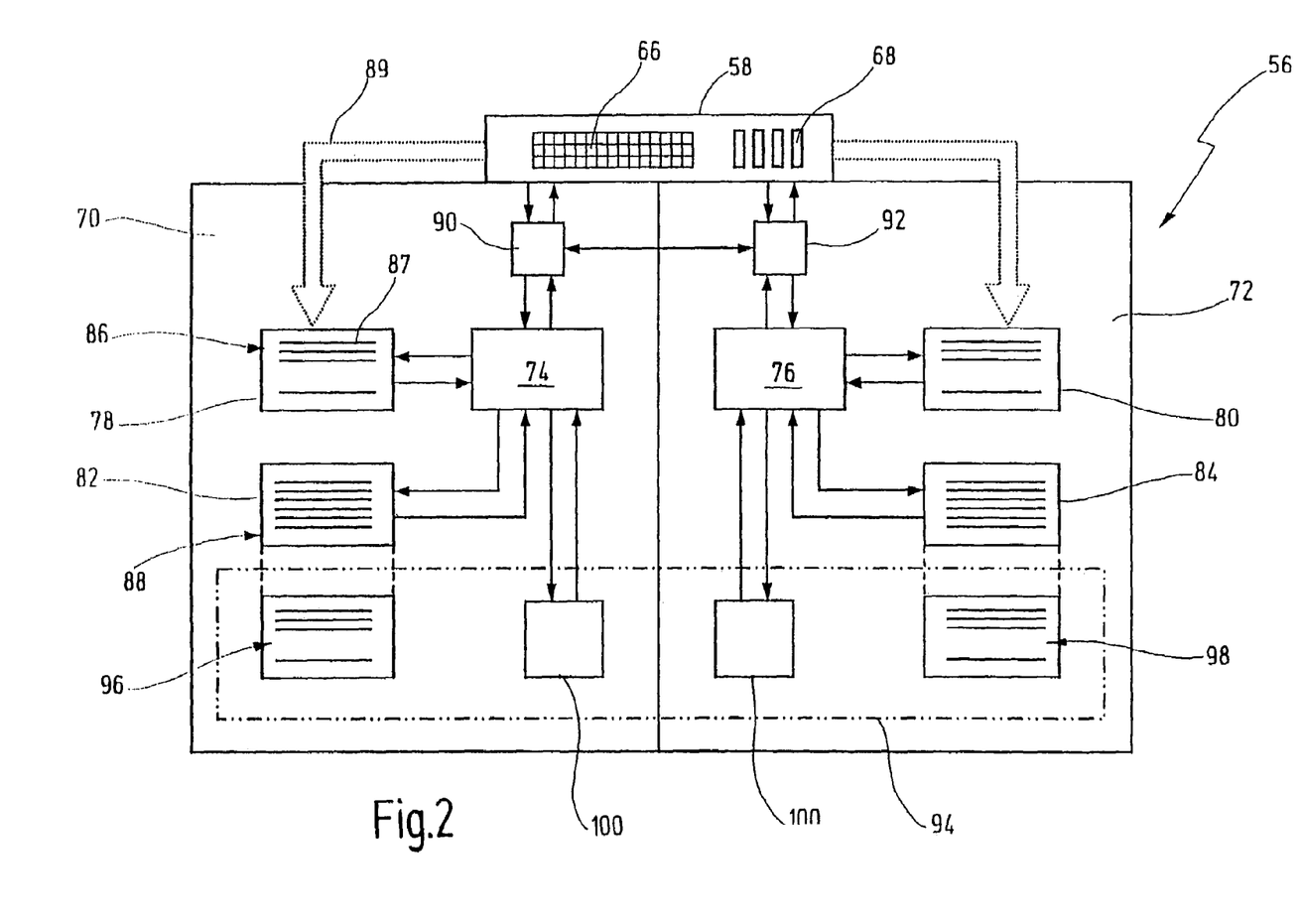
FIG. 2 shows a schematic functional block diagram of a control unit of the machine tool from FIG. 1.

In FIG. 2 the two functional units of the control unit 56 are illustrated, organized schematically. However, it goes without saying that this structure merely shows a possible typical implementation and that the functional groups shown can also be implemented in other combinations. In principle, it is also possible to implement the entire control functionality of the control unit 56 on a conventional PC. The two-part functional structure illustrated here can also be implemented with only one processor and a common memory.

Operating desk 58 contains, inter alia, a keyboard 66 for data entry and a monitor, not shown here, for displaying status information and outputting other data. Furthermore, some interfaces 68, via which, for example, an NC control program can be read in, are indicated schematically here.

As already mentioned above, control unit 56 contains a divided functionality, namely an NC controller 70 known per se for controlling the operating movements of the spindle 12 and a PLC for controlling all the other operating movements and operations. Both controllers, at least if they are implemented on different hardware platforms, respectively have a processor 74, 76, a working memory 78, 80 and a read-only memory 82, 84. Stored in working memory 78 of the NC controller 70, inter alia, is the NC program 86, which determines the operating movements of the spindle 12 by using a large number of control sets 87 to be carried out successively. On the other hand, the operating system 88 of the NC controller 70 is stored in read-only memory 82. The operator of a machine tool generally has no influence on the latter, while he generates the NC program 86 himself and loads it into the working memory 78. This is indicated in FIG. 2 by an arrow 89.

Reference numbers 90 and 92 designate two I/O modules, using which the processors 74, 76 can read and output data. Amongst other things, a data interchange between the NC controller 70 and the PLC 72 is also carried out via these interfaces.

Reference number 94 indicates a starting logic which implements the novel method for the restart of machine tool 10 here. Starting logic 94 includes program modules 96, 98 which rely both on functionalities of the NC controller 70 and on functionalities of the PLC 72. Furthermore, starting logic 94 here includes non-volatile memories 100 for the storage of parameters which make it easier to determine the second trajectories.

Figure 3:
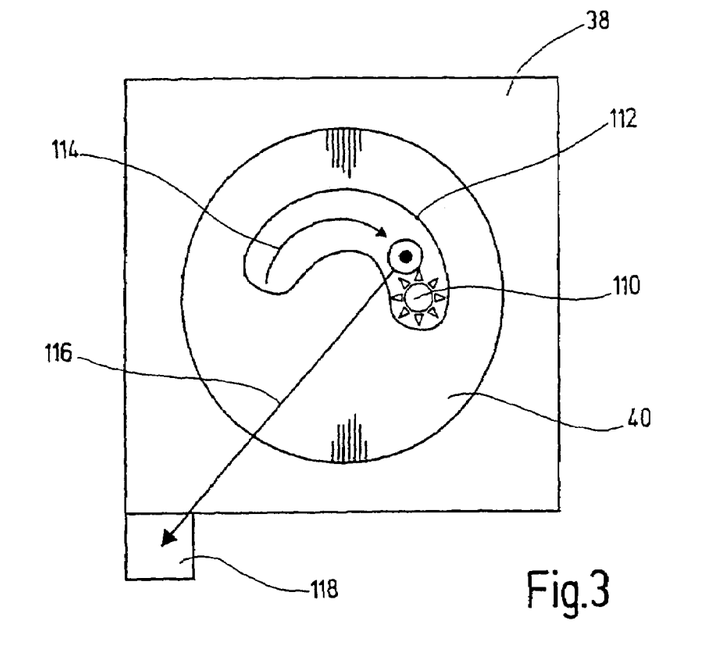
FIG. 3 shows a schematic illustration of a second trajectory in the case of a mill for internal machining.
Figure 4:
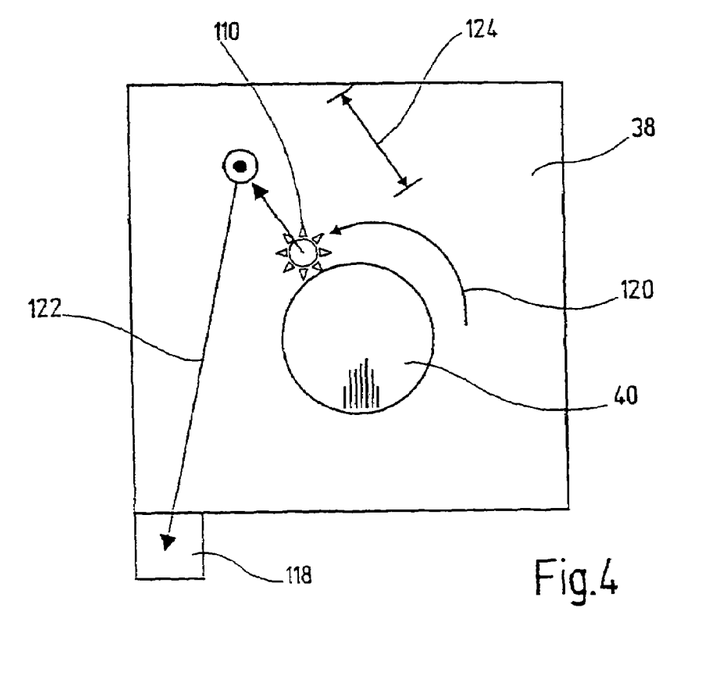
FIG. 4 shows a schematic illustration of a second trajectory in the case of a mill for external machining.

In order to illustrate the method according to the invention, two examples of movement sequences are illustrated in FIGS. 3 and 4. These concern a schematic plan view of the clamping device 38 on which a workpiece 40 is clamped. In FIG. 3 the workpiece 40 is machined by way of example with a milling head 110, in order to mill an internal contour 112. In this case, milling head 110 is guided along a first (relative) trajectory 114, specifically by using control sets 87 which are stored in the NC controller 70.

If an unplanned interruption of the machining operation occurs, for example as a result of an emergency stop command or any interruption to the power supply, machine tool 10 is in an undefined state. Machine tool 10 preferably contains emergency routines, however, with which the milling head 110 can be stopped in a type of emergency braking if the unplanned event occurs, as is known, for example, from WO 00/66320 already mentioned at the beginning. However, this is not absolutely necessary for the implementation of the novel method.

According to the novel method, milling head 110 is now moved along an automatically determined second trajectory 116 into a defined starting position 118, irrespective of whether it was stopped during controlled emergency braking or in an uncontrolled manner due to the unexpected event. In the present example, the second trajectory includes moving the milling head 110 (by means of the spindle 12) out of the workpiece 40 firstly in the z direction. The milling head 110 is then moved under control to the starting position 118. In a particularly preferred embodiment, the defined starting position 118 is the tool magazine 44, since the machine tool 10 is put into an advantageous basic state in this way. In addition, depositing the milling head 110 in tool magazine 44 permits simple inspection of the milling head 110 for damage. In principle, however, starting position 118 can also be defined in another way.

FIG. 4 shows another scenario under otherwise identical assumptions about the operating sequence. As distinct from FIG. 3, however, workpiece 40 is machined on its outside with a milling head 110, i.e. an external contour is milled along a first trajectory 120. For such a case, it has been proven to be an advantageous strategy to lift the milling head 110 off the workpiece 40 in the radial direction during the restart of the machine tool 10. Only then is the withdrawal of the milling head 110 in the z direction carried out, and also the subsequent movement into the starting position 118. The corresponding second trajectory is designated by the reference number 122 in FIG. 4.

As can easily be understood from FIGS. 3 and 4, the two trajectories 116 and 122 differ since, in the case of FIG. 3, the milling head 110 is immediately moved back in the z direction, whereas in the scenario according to FIG. 4 the milling head 110 is firstly lifted radially off workpiece 40. The determination of the second trajectory 116, 122 therefore depends on the machining operation in which the unplanned interruption of the production operation occurred.

In the case of FIG. 4, suitable second trajectory 122 can be determined effectively if the starting logic 94 has information as to how far the milling head 110 can be lifted off the external contour of the workpiece 40. The corresponding distance is indicated in FIG. 4 by reference number 124. Therefore, for cases of the type shown in FIG. 4, the space available is preferably stored as a parameter, specifically in the NC program 87.

In an advantageous exemplary embodiment, various control sets for second trajectories 116, 122 are stored in the starting logic 94. The respectively suitable control set is selected as a function of the scenario in which the unplanned interruption occurred. A particularly preferred selection takes into account the tool types used in each case, which are combined to form suitable groups. In one exemplary embodiment, the selection of the second trajectory is carried out in the following way (abridged):

| Tool type/scenario | Strategy |
| --- | --- |
| Milling tools, group 100–121, 146, 155, 156 Drills, group 200–231, 250 Lathe tools for horizontal turning, group 500 | Withdraw in z direction, deposit in tool magazine |
| Thread taps, group 240–242 | Withdraw in z direction, at the same time run the operating spindle synchronously in accordance with the thread pitch, deposit in tool magazine. |
| Mills for internal machining, group 145, 150 Lathe tools for vertical turning, internal machining, group 500–540 | Move to a free travel position, withdraw in z direction, deposit in tool magazine |
| Mills for external machining, group 145, 150 | Lift radially off external contour, withdraw in z direction, deposit in tool magazine |
| Lathe tools for vertical turning with external | Withdraw in y direction, deposit in tool magazine |

-continued

| Tool type/scenario | Strategy |
| --- | --- |
| machining, group 500–540 Remaining scenarios | Move along trajectory with predefined reference points, deposit in tool magazine |

The above group designations here are modeled on the widespread classification which is used in NC control from Siemens, Germany, for tool management. It goes without saying, however, that other classification systems differing from this can also be used.

In a particularly preferred embodiment, coordinated driving of all the auxiliary units, such as tool magazine 44 in which the tools are deposited as a starting position, is carried out in parallel with the functionalities of the NC controller 17. In this case, it may be necessary to move hydraulic pistons and other drives firstly into a defined position, in order to coordinate the movement sequences with the movements of the operating spindle.

With reference to the following flow charts, preferred exemplary embodiments of the method according to the invention will be further explained.

Figure 5:
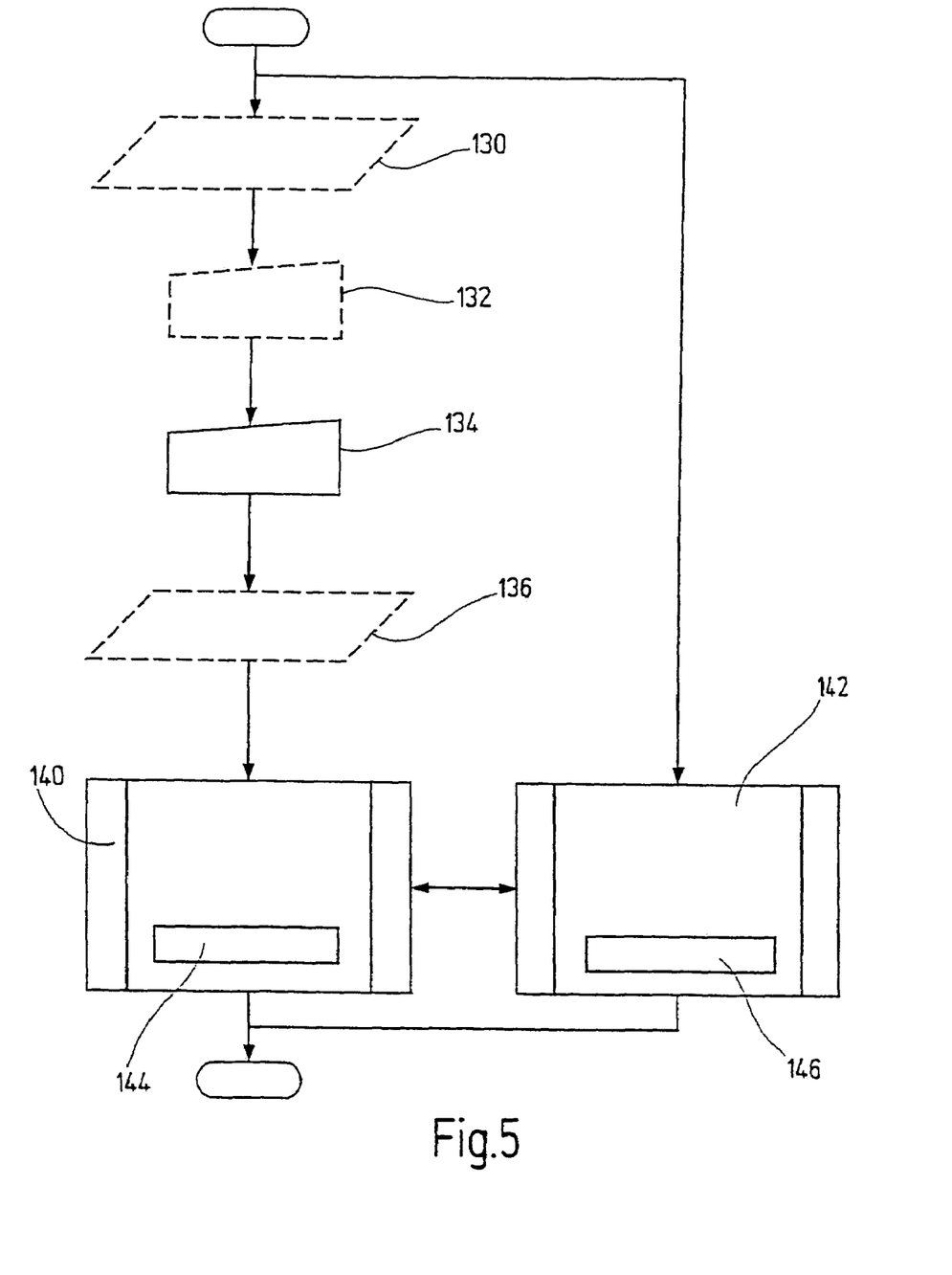
FIG. 5 shows a schematic functional diagram to explain the overall sequence of the novel method.

FIG. 5 shows an overview of the entire operating sequence of the machine tool 10. In a first step 130, control sets for prepared second trajectories 116, 122 are read in in accordance with the scenarios just explained. Preferably, however, these prepared second trajectories are stored in the read-only memory 82 of NC controller 70 by the machine manufacturer. In steps 132 and 134, entry of reference points takes place, and also the loading of NC program 86 which is provided for the machining operation. The entry of reference points according to step 132 is advantageously carried out in order to enable a "fall back strategy" mentioned above at the end of the table. If the entry of reference points according to step 132 is omitted, it is not possible to carry out this fall back strategy. However, the other strategies can be carried out on the basis of the scenario which is present at the time of the unplanned interruption. Even in this reduced implementation of the novel method, a noticeable reduction in down times is already achieved.

Steps 132 (reading the reference points in) and 134 (reading the NC program in) can also be combined into one step, differing from the illustration shown here, by the reference points being inserted into the NC program 86 to be executed. Depending on the implementation, a separate but converse order is also possible.

In step 136, all the data which are present in the NC program 86 for controlling the first trajectories 114, 120 and which are required for a suitable determination of the second trajectories 116, 122 are stored in the non-volatile memory 100. Then, in the program blocks 140, 142, the machining operations are started. The program block 140 symbolises the execution of the individual control sets within the context of the NC program 86, while the program block 142 represents the execution of the control commands in the PLC, running in parallel therewith. An arrow indicates that a data interchange for mutual coordination can be carried out between the two program blocks. Reference numbers 144, 146 schematically indicate emergency routines which, within the context of these control systems, are executed if an unplanned event occurs. By using the emergency routines, the machine tool is stopped if an unplanned event occurs.

Figure 6:
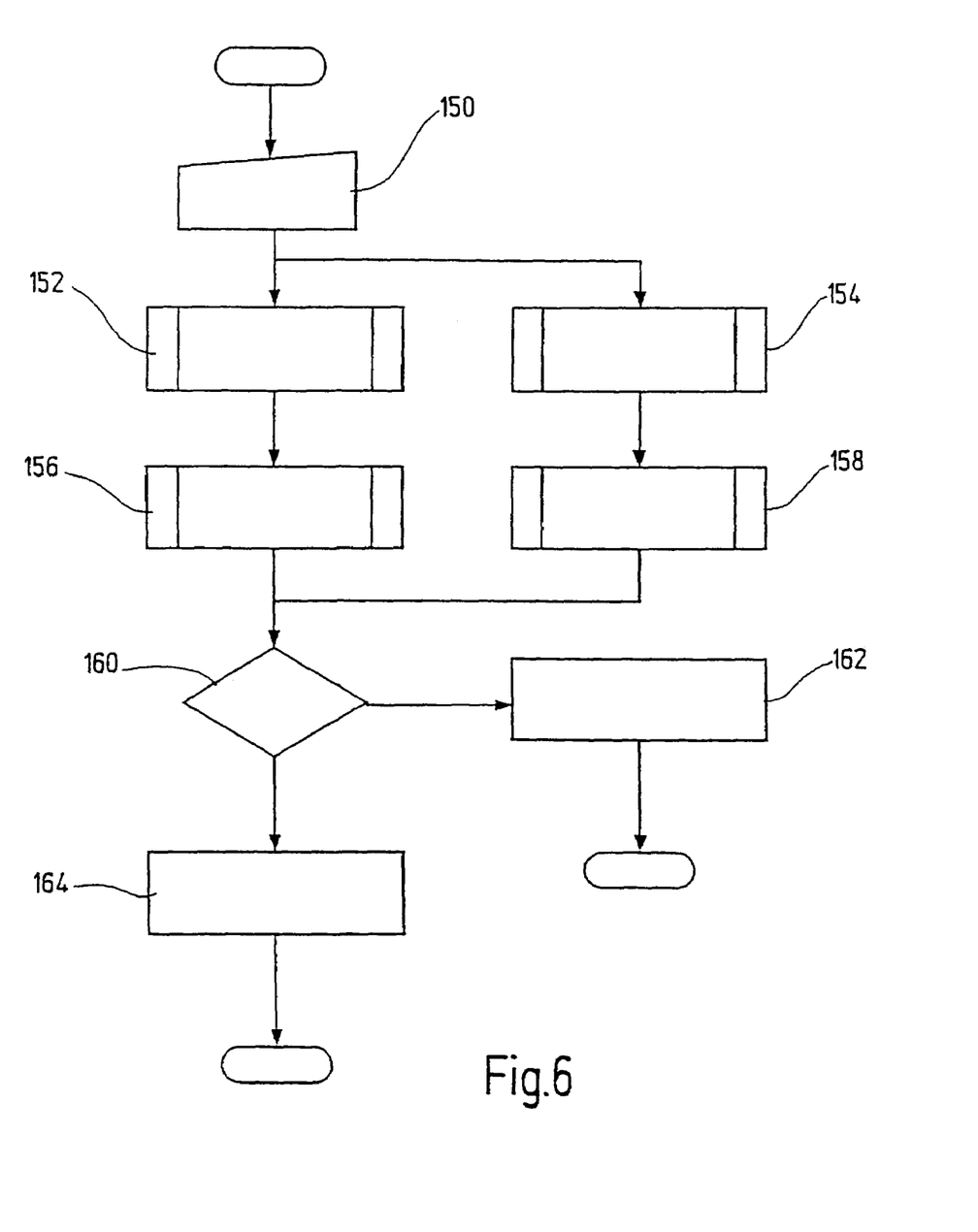
FIG. 6 shows a schematic functional diagram to explain the restart of the machine tool from FIG. 1 following an unplanned interruption.

FIG. 6 shows the operating sequence after machine tool 10 has been stopped by means of the emergency routines 144, 146.

In step 150, first of all a starting command is read in, which is generated by the machine operator in order to initiate the restart of the machine tool 10. In the program blocks 152, 154, the determination of second trajectories is then carried out, preferably here in parallel both for the operating spindle 12 (stated generally, for all the NC axes) and for any auxiliary units belonging to the machine tool 10. The operating spindle 12 and the auxiliary units are then brought into their defined starting positions, which is indicated by program blocks 156, 158. In program step 160, a decision is then made as to whether the interrupted machining operation is to be continued on the partly machined workpiece or whether a new production cycle with a new workpiece is to be started. On this basis, the control then enters the NC control step in which the interruption took place (step 162), or a restart is made with the first NC control step (step 164).

Figure 7:
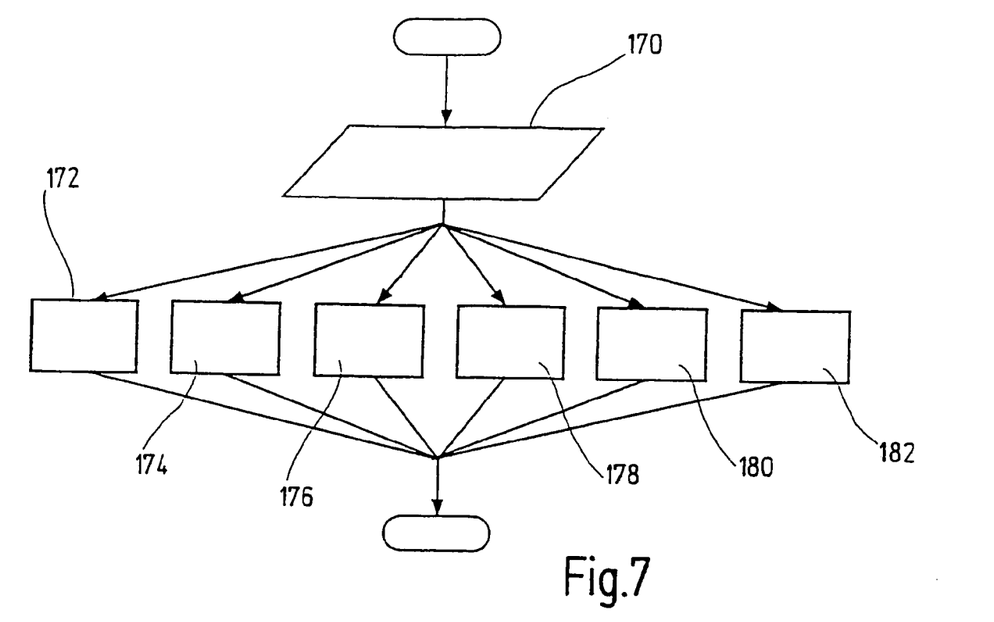
FIG. 7 shows a schematic functional diagram to explain a preferred exemplary embodiment within the method according to FIG. 6.

FIG. 7 illustrates a preferred exemplary embodiment for determining the second trajectories. According to step 170, first of all the kind of tool (tool type) and the scenario in which the interruption has occurred are determined. A case differentiation is then made due to which control sets for a suitable second trajectory are selected from a large number of prepared control sets. In a preferred exemplary embodiment, the selection is made from the strategies explained in the table specified further above. The different strategies are designated in FIG. 7 by reference numbers 172, 174, 176, 178, 180 and 182. Following the selection of the suitable strategy, operating spindle 12 and tool 32 held therein are then brought into the starting position 118 along the predefined second trajectories.

Figure 8:
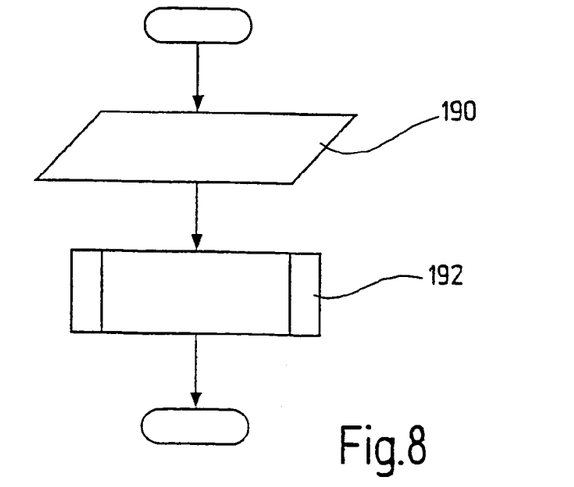
FIG. 8 shows a schematic functional diagram to explain an alternative exemplary embodiment within the method according to FIG. 6.

Another preferred embodiment is illustrated in FIG. 8. In this case, in step 190, once more the scenario in which the unexpected interruption has occurred is determined. Then, in program block 192, the determination of the second trajectory is carried out by using the machine steps passed through up to the time of the interruption. In other words, the second trajectory is determined by the first trajectories passed through hitherto being run through in reverse. The corresponding control data can in this case be generated from the NC program 86 saved in a non-volatile manner.

What is claimed is:

1. A method for operating a machine tool comprising a tool carrier moveable relative to a workpiece along first relative trajectories and comprising a first controller for controlling relative operational movements of the tool carrier, the method comprising the steps of:

providing a first control program comprising a series of machining operations, with the series of machining operations defining the first relative trajectories, loading the first control program into the first controller, moving the tool carrier along the first relative trajectories in order to perform machining operations on the workpiece, said step of moving being controlled by the first controller, stopping the relative operational movements of the tool carrier at a stop location along the first relative trajectories if an unplanned event occurs, and restarting relative operational movements of the tool carrier along the first relative trajectories from a starting position, wherein the tool carrier is moved from the stop location into the starting position along second relative trajectories, wherein the second relative trajectories are automatically determined as a function of the machining operation in which the unplanned event occurred, and wherein the tool carrier is automatically moved into the starting position from the stop location when the restart begins.

2. The method of claim 1, wherein the tool carrier holds a tool during the machining operations, with the tool being selected from a plurality of tools of different kinds, and wherein the second relative trajectories are determined as a function of the kind of tool that is held in the tool carrier when the unplanned event occurs, so that individual second trajectories are run through depending on the kind of tool used when the unplanned event occurs.

3. The method of claim 2, wherein the plurality of tools are grouped in order to form groups of tools of the same kind, and wherein the second trajectories are determined as a function of group membership of the tool used.

4. The method of claim 1, wherein the second relative trajectories are selected from a set of predefined second relative trajectories.

5. The method of claim 1, wherein the second relative trajectories are determined as a function of first parameters, which are stored in the first controller before the machining operation.

6. The method of claim 1, wherein the second relative trajectories are determined as a function of second parameters, which are stored in a non-volatile memory.

7. The method of claim 1, wherein the second relative trajectories are determined as a function of the first relative trajectories defined in the first control program.

8. The method of claim 7, wherein the second relative trajectories are determined as a reverse image of the first relative trajectories.

9. The method of claim 1, further comprising a step of entering an operating parameter at the restart, wherein the machining operation in which the unplanned event occurred is resumed as a function of the operating parameter read in.

10. A method for operating a machine tool comprising a tool carrier moveable relative to a workpiece along first relative trajectories, the method comprising the steps of:
controlling relative operating movements of the tool carrier along the first relative trajectories by means of a first control program which defines a series of successive machining operations,
stopping the relative operating movements of the tool carrier if an unplanned event occurs, and
restarting the relative operating movements of the tool carrier from a starting position,
wherein the tool carrier is moved from its current position after stopping into the starting position along second relative trajectories,
wherein the second relative trajectories are automatically determined as a function of the machining operation in which the unplanned event occurred, and
wherein the tool carrier is firstly moved along the second trajectories when the restart begins.

11. The method of claim 10, wherein the tool carrier holds a tool from a set of different tools during the relative operating movements, and wherein the second relative trajectories are determined as a function of that tool which is held in the tool carrier when the unplanned event occurs, so that individual second trajectories are run through depending on the tool used.

12. The method of claim 11, wherein the different tools are combined into groups of tools of the same type, and wherein the second trajectories are determined as a function of a group membership of the tool used.

13. The method of claim 10, wherein the second relative trajectories are selected from a set of predefined second relative trajectories.

14. The method of claim 10, wherein the second relative trajectories are determined as a function of first parameters, which are stored in the first control program.

15. The method of claim 10, wherein the second relative trajectories are determined as a function of second parameters stored in a non-volatile memory.

16. The method of claim 10, wherein the second relative trajectories are determined as a function of the first relative trajectories.

17. The method of claim 16, wherein the second relative trajectories are determined as a reverse image of the first relative trajectories.

18. The method of claim 10, wherein an operating parameter is read in at the restart, and the machining operation in which the unplanned event occurred is resumed as a function of the operating parameter read in.

19. The method of claim 10, wherein the machine tool further comprises auxiliary units which are driven in coordination with the first relative trajectories, wherein the auxiliary units are also brought into respective starting positions at the restart, and wherein the respective starting positions are determined automatically on the basis of the machining operation in which the unplanned event occurred.

20. The method of claim 19, wherein the auxiliary units are controlled by a second controller, the first and the second controllers being coordinated by means of a restarting logic.

21. The method of claim 10, wherein the tool carrier is moved along the second relative trajectories at a lower speed than along the first relative trajectories.

22. A method for operating a machine tool comprising a tool carrier moveable relative to a workpiece and comprising a first controller for controlling a relative operating movement of the tool carrier in relation to the workpiece, the method comprising the steps of:
controlling first relative trajectories of the tool carrier by means of a first control program loaded into the first controller,
stopping the relative operating movements of the tool carrier if an unplanned event occurs, and
restarting the relative operating movements of the tool carrier from a starting position,
wherein, at the time of the restart, the tool carrier is first moved along defined second relative trajectories into the starting position, and wherein the second relative trajectories are determined automatically as a function of the machining operation in which the unplanned event occurred.

23. A machine tool for metal cutting machining of metallic workpieces, comprising a tool carrier moveable relative to a workpiece, comprising a first controller for controlling first relative trajectories of the tool carrier by means of a first control program defining a series of successive machining operations, and comprising a starting logic for restarting first relative trajectories after an unplanned interruption of the machining operations occurred, wherein the starting logic is configured to move the tool carrier from a current position after the unplanned interruption into a starting position along second relative trajectories, and wherein the starting logic is further configured to automatically determine the second relative trajectories as a function of the machining operation in which the unplanned interruption occurred.

24. The machine tool of claim 23, further comprising a tool magazine for providing a plurality of various tools, wherein the starting logic is configured for determining the second relative trajectories as a function of that tool which is held in the tool carrier when the unplanned interruption occurs, so that individual second trajectories are run through depending on the type of tool used.

25. The machine tool of claim 24, wherein the plurality of tools are combined into groups of tools, with the starting logic being configured to determine the second trajectories as a function of a group membership of the tool used in the machining operation when the unplanned interruption occurred.

26. The machine tool of claim 23, wherein the starting logic comprises a plurality of control modules, with each control module defining an individual second relative trajectory.

27. The machine tool of claim 23, further comprising a plurality of auxiliary units and a second controller for controlling the auxiliary units, with the starting logic being configured to coordinate the first and the second controller during a restart following the unplanned interruption.

28. An operating program module for a machine tool comprising a tool carrier moveable relative to a workpiece along first relative trajectories and comprising a machine tool controller for controlling machining operations on the workpiece, the program module comprising program code for carrying out the following steps when the program module is executed on the machine tool controller:
- determining second relative trajectories for moving the tool carrier from a position after an unplanned stopping into a starting position for a restart, and
- moving the tool carrier along the second relative trajectories into the starting position as a first step of an automated restart,
- wherein the second relative trajectories are determined automatically as a function of the machining operation in which the unplanned stopping occurred.

* * * * *